Figure 3:
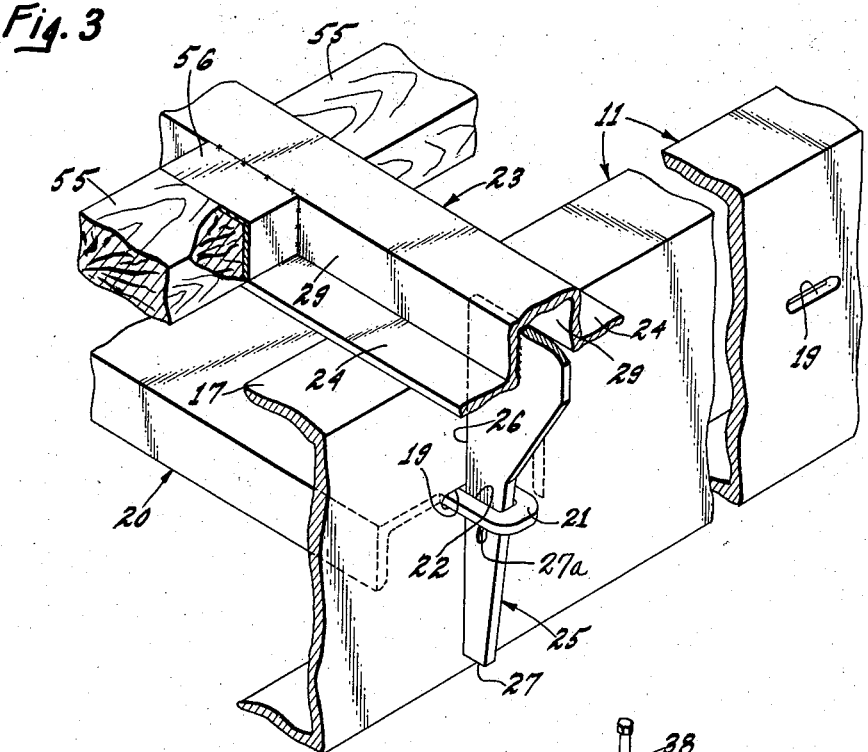

Sept. 9, 1958  J. P. FELBURN  2,851,281
BED ASSEMBLIES FOR VEHICLES
Filed Dec. 18, 1956  3 Sheets-Sheet 1
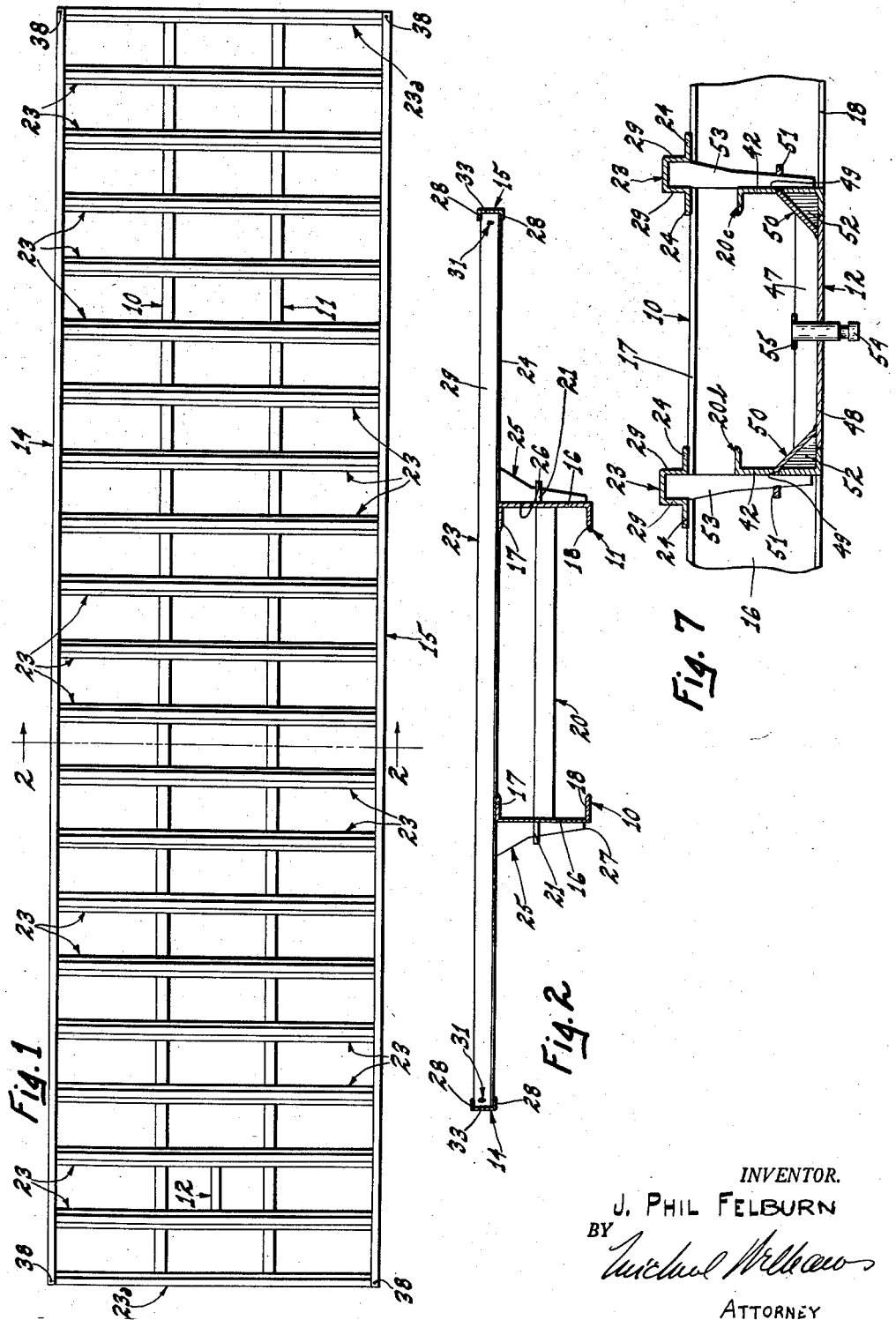
INVENTOR.
J. PHIL FELBURN
BY
ATTORNEY Sept. 9, 1958 J. P. FELBURN 2,851,281
BED ASSEMBLIES FOR VEHICLES
Filed Dec. 18, 1956 3 Sheets-Sheet 2

INVENTOR.
J. PHIL FELBURN
BY
ATTORNEY

Sept. 9, 1958 J. P. FELBURN 2,851,281
BED ASSEMBLIES FOR VEHICLES
Filed Dec. 18, 1956 3 Sheets-Sheet 3
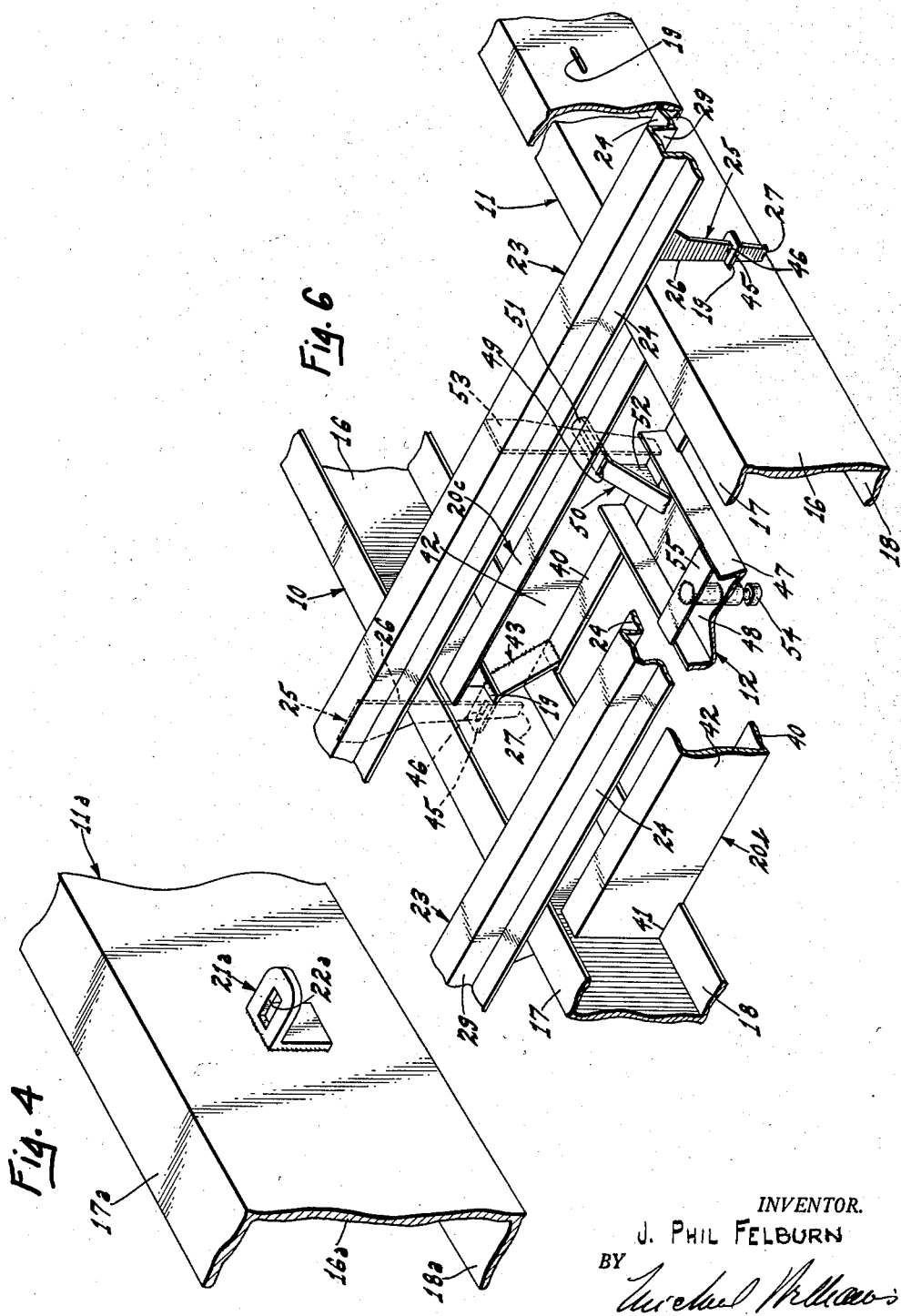
INVENTOR.
J. PHIL FELBURN
BY
ATTORNEY United States Patent Office 2,851,281
Patented Sept. 9, 1958

2,851,281

BED ASSEMBLIES FOR VEHICLES

John Phil Felburn, Dayton, Ohio

Application December 18, 1956, Serial No. 629,080

13 Claims. (Cl. 280—106)

My invention relates to bed assemblies for vehicles, more particularly to bed assemblies for tractor-drawn trailers, and the principal object of my invention is to provide new and improved assemblies of such character.

Practically all of the vehicles presently manufactured are factory built; that is, they are assembled at the factory and thereafter transported to the user. A vehicle bed, particularly that of a tractor-drawn trailer, is a relatively large item and, as a consequence, it occupies considerable factory space during its assembly and during subsequent storage and/or shipment. An object of this invention is to reduce the factory, storage and shipping space required by a vehicle bed assembly.

Most of the vehicle beds presently manufactured are of a construction which requires bolts, rivets or welds, or any combination of the three, to thus produce a structurally integral assembly having the disadvantages above pointed out. Further, because of such construction, assembly time is a considerable factor in the ultimate cost and this, plus the need for skilled or semi-skilled labor, makes the cost of a vehicle quite high in comparison to other apparatus which may be manufactured and assembled by use of efficient production methods. Accordingly, a further object of my invention is to take advantage of modern-day production methods in the manufacture and assembly of vehicle beds.

My invention provides a vehicle bed assembly composed of components which may be easily and quickly assembled with only the most ordinary tools. These components may be stored and/or shipped in compact manner, thus reducing the amount of factory and storage space. Since many of the components are identical in design, they may be produced in quantity by high production stamping and forming operations. Also, since the vehicle bed components are easily assembled by unskilled workmen, a package assembly may be economically shipped to a user and the latter, or sunskilled labor under his direction, may assemble the bed at the place of use. Accordingly, a further object of my invention is to produce a knock-down bed assembly which may be assembled by unskilled labor in a minimum of time.

Since the vehicle bed of my invention is of knock-down construction, it may be easily disassembled for transportation, storage or for repair. Damage to any portion of the bed does not require a major disassembly operation since only the damaged component parts need be ordered and these parts may be easily installed in place of the damaged parts.

Figure 5:
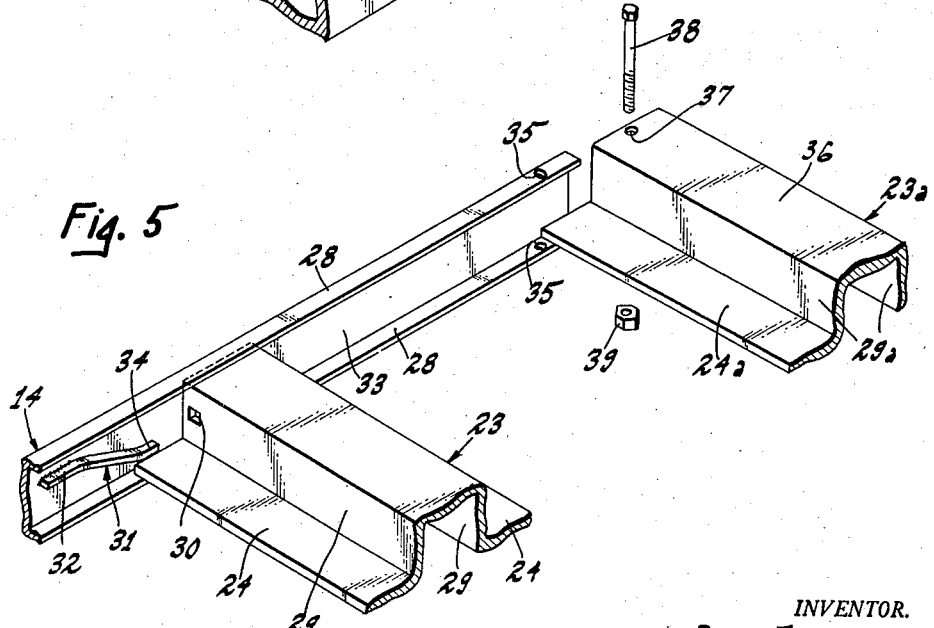

In the drawings accompanying this specification and forming a part of this application, there is shown, for the purpose of illustration, an embodiment which my invention may assume, and in these drawings:

Figure 1 is a plan view of a vehicle bed constructed in accordance with my invention, Figure 2 is an enlarged transverse sectional view corresponding generally to the line 2—2 of Figure 1, Figure 3 is an enlarged, fragmentary perspective view showing the assembly of certain parts embodied in the construction illustrated in Figures 1 and 2, Figure 4 is a fragmentary perspective view of an alternate construction, Figures 5 and 6 are enlarged, fragmentary perspective views showing the assembly of certain other parts of the construction, and Figure 7 is a fragmentary sectional view further illustrating the assembly shown in Figure 6.

My invention is particularly suited for the production of beds for tractor-drawn trailers although it will be appreciated that the invention may be used in the production of a bed for a vehicle of any other type, such as a truck, passanger car, and the like.

Referring particularly to Figures 1 and 2 of the drawings, the vehicle bed therein described is primarily designed for use in a tractor-drawn trailer and comprises a pair of longitudinally extending members 10, 11 which may be formed of rigid material and of any suitable shape, such as the channel iron section herein disclosed. A plurality of similar spaced cross-members 23 are disposed cross-wise of the longitudinally extending members 10, 11 with end portions extending therebeyond. The cross-members and longitudinally extending members are joined by complementary interfitting portions in part carried by the cross-members and in part carried by the longitudinally extending members. Two rub rails 14, 15 are secured to the oppositely extending end portions of the cross-members again by complementary interfitting portions in part carried by the cross-members and in part carried by the rub rails.

In the event the bed assembly is to be hauled by a tractor, a support member 12 is carried by the bed, the member supporting a king-pin for cooperation with the usual fifth wheel assembly carried by the tractor. The support member 12 is also connected to the aforementioned assembly by complementary interfitting parts.

Thus, all the parts constituting the foregoing assembly may be manufactured in quantity and at a greatly reduced cost, and may be stored and/or shipped utilizing a minimum of space. The component parts of the bed may be easily assembled, with use of only the most common tools and, since the parts locate each other, no jigs or fixtures are needed and no skill is required to effect the assembly. After assembly of the bed, any desired wheel structure may be secured in position underlying the bed. Since any commercially available wheel structure may be used, it is believed that disclosure of such structure is not necessary.

Referring particularly to Figures 3 through 7 of the drawings, the embodiment of the invention herein disclosed comprises the longitudinally extending members 10, 11 which are here shown to be channel-shaped in cross-section, with the web 16 of each channel upright and with the top and bottom flanges 17, 18 generally horizontal, the flanges of the two members facing each other.

The web 16 of each member 10, 11 is formed with a series of longitudinally extending slots 19. First cross-members 20, preferably of channel shape as shown, are disposed between the facing surfaces of the webs 16, opposite ends of each cross-member 20 forming shoulders which abut such facing surfaces. A tab 21 extends from each of the opposite ends of each cross-member 20, each tab fitting into and extending through paired slots 19 in the longitudinally extending members 10, 11. As best seen in Figure 3, tabs 21 are slotted, as at 22, and project laterally of the outwardly directed surfaces of the webs 16.

Second cross-members 23, of a number corresponding to the cross-members 20, overlie respective cross-members 20. The cross-members 23 may have any desired cross-sectional shape and, in the present embodiment, such members are of hat-shape cross-section for a purpose to appear.

The horizontal flanges 24, 24 of the members 23 are adapted to bear against the top flanges 17 of the longitudinally extending members 10, 11. The cross-members 23 are preferably longer than the cross-members 20 and have opposite end portions, as seen in Figures 1 and 2, extending uniformly beyond the longitudinally extending members 10, 11 to generally define the width of the bed.

Each cross-member 23 has spaced tongues 25 which extend downwardly therefrom and are adapted to be received in the slots 22 of corresponding tabs 21. The tongues 25 may take any suitable form and, at present, it is preferred to form these tongues of metal plate and of wedge shape. The tongues may be suitably welded or otherwise secured within the channel section of cross-members 23.

To assemble the structure thus far described, the cross-members 20 may first be assembled with the longitudinally extending members by inserting the tabs 21 on one end of each cross-member through the corresponding slots 19 in one of the longitudinally extending members. The other longitudinally extending member may then be positioned so that its slots 19 receive and pass the tabs on the opposite ends of the cross-members 20. Since the slots, tabs and cross-members may be accurately formed by stamping methods, the parts will closely interfit and locate each other without the use of jigs or fixtures.

The cross-members 23 may then be successively assembled with the longitudinally extending members 10, 11 and with corresponding cross-members 20, it being merely necessary to start the tongues 25 of each cross-member 23 through the slots 22 of the outwardly projecting tabs 21 of a corresponding cross-member 20.

Since the tongues 25 are of wedge shape, their insertion into respective slots will tightly draw the webs 16 against the shoulders defined by the opposite ends of each cross-member 20, the straight side 26 of each tongue bearing against the outwardly directed surface of a respective web. It is preferable that the wedge-shaped tongues 25 draw the parts into tight abutting relationship before the tongues are entirely home. Thereafter, a striking blow (or blows) may be applied to the cross-members 23 in the area of each tongue to finally seat the tongue wedges and to abut the horizontal flanges 24, 24 of respective cross-members 23 against the upper flanges 17, 17 of the longitudinally extending members 10, 11. This final force preferably required to complete the assembly locks the tongues 25 in corresponding tabs 21 and restricts unintentional disassembly of the parts. To intentionally disassemble the parts, it is merely necessary to apply a sharp blow to each tongue 25, at its lower edge 27, to release the locking effect. Thereafter, the parts may be disassembled in reverse order of the assembly above described. To positively lock the parts against disassembly, particularly when no load is carried by the bed, each tongue 25 may have an aperture 27a for receiving a cross-pin (not shown).

Attention is particularly directed to Figure 3 wherein it is seen that the end of the cross-member 20 provides a substantial surface for abutment with the adjacent inner surface of the web 16. Further, the straight edge 26 of the tongue provides a relatively long surface, at right angles to the end surface of the cross-member 20, for abutment with the adjacent outer surface of the web 16. When the tongues are finally seated and locked, the adjoining surfaces of the cross-member 20, web 16 and tongue edge 26 are firmly abutted, thus providing a bed frame of considerable rigidity. This rigidity is enhanced by the fact that the flanges 24, 24 of each cross-member 23 are firmly abutted against the upper flanges 17 of the longitudinally extending members 10, 11.

In some cases, such as in beds which are required to carry lighter loads or which are not subjected to a high stress, the cross-members 20 may be omitted. Thus, as shown in Figure 4, angular tabs 21a may be welded to or punched out of the outwardly facing surfaces of the webs 16a, the tabs having slots 22a for receiving the tongues 25 of the cross-members 23.

It is preferable, in the usual bed constructions, to provide rub rails at longitudinally opposite sides of the bed, to protect the bed against damage which may occur when the bed is rubbed against another object and to additionally strengthen the bed. My invention provides easy and quick connection of the rub rails by means of interfitting projection and recess connection.

Referring particularly to Figure 5, each of the rub rails 14, 15 is here shown of channel section, the flanges 28, 28 of each rail being preferably spaced to snugly receive the heighth dimension of the cross-members 23. One, or both, of the upright walls 29 of each cross-member 23 is formed with an aperture 30 at its opposite ends. Each rub rail carries a series of tongues 31 spaced in accordance with the disposition of the assembled cross-members 23.

Each tongue 31 may be in the form of a steel bar which is bent to provide off-set portions. One portion 32 of each tongue 31 may be welded to the inner surface of the web 33 of a rub rail while the other portion 34 is held spaced from such inner surface.

All of the tongues 31 on each side rail extend in the same longitudinal direction with the portions 34 all directed the same way. Thus, to assemble a rub rail 14 or 15 with the cross-members 23, it is merely necessary to fit the rail channel over the ends of the member 23, with the rail longitudinally positioned so that the tongues 31 are spaced from the adjacent upright wall 29. The rub rail is then longitudinally moved to position the ends of tongue portions 34 into the apertures 30 and further movement seats such portions in the apertures. Since the tongue portion 34 gradually curves from the web 33 of the rub rail, a wedge action is provided which tightly abuts the end of the cross-member 23 against the web 33 of the rub rail. Since the end of the member 23 is closely received between the flanges 28, 28 of the rub rail, the assembly provides great rigidity.

Since a pulling force applied to the extreme end cross-member 23a or a rearwardly directed force on rub rail 14 may be sufficient to unlock the tongue and aperture connection, provision is made against such contingency. As shown in Figure 5, the flanges 28, 28 of each rub rail may be provided with aligned apertures 35, 35 and the web 36 of the member 23a may be provided with an aperture 37. The apertures 35 and 37 may be aligned to pass a bolt 38. A nut 39 may be threaded on the bolt to maintain the assembly. It will be noted that the bolt connection thus provided will positively prevent disassembly of the tongue and aperture connections between the rub rail and the other cross-members 23. Disassembly of the rub rails merely requires removal of the bolts 38 and application of a sharp blow to that end of the rub rail adjacent to the apertures 35. Such blow will unlock the tongues 31 and will permit longitudinal movement of the rub rail to remove the tongues 31 from the apertures 30.

In the event the bed forms part of a tractor-drawn trailer, provision may be made for the bed to carry a king-pin to cooperate with the fifth wheel plate carried by a tractor. Here again the various members are joined by interfitting parts provided for easy assembly.

As shown in Figure 1, a support member 12 is carried between two cross-members at the forward end of the bed. Referring particularly to Figures 6 and 7, the cross-members 20b and 20c are modified versions of the cross-members 20 hereinbefore described.

Since it is desirable to free the under part of the bed of obstructions in the vicinity of the king-pin and fifth wheel plate assembly, the horizontal flanges 40 of the cross-members 20b and 20c are maintained flush with the lower flanges 18 of the longitudinally extending members 10, 11. This may be accomplished by removing a part of the lower flanges 40 of each cross-member 20b, 20c at the opposite ends thereof, as shown at 41, and notching the web 42 of each cross-member to closely receive the lower flange of the respective longitudinally extending member.

Each cross-member 20b, 20c at opposite ends thereof, has a V-shaped plate 43 welded thereto. Each plate 43 has a terminal tab portion 45 which is adapted to project through a proper slot 19 in the longitudinally extending members 10, 11, the outwardly projecting part of each terminal tab portion 45 being slotted as at 46, to receive the wedge-like tongue 25 of an overlying cross-member 23. As before, the wedge-like tongues 25 of the cross-members will firmly hold the various parts in abutted and assembled relation.

The support member 12 is here shown as of upwardly opening channel form, and provided with upright flanges 47, 47 and a connecting web 48. Parts of the web are removed at opposite ends of the support 12 to enable the support member to be flush with the lower portion of lower flanges 40 of the cross-members 20b and 20c.

Intermediate their extent, webs 42 of the cross-members 20b, 20c are each formed with a slot 49 similar to the slots 19 in the longitudinally extending members 10, 11. An angled plate 50 is welded to the web 48 of the support 12 at each of the opposite ends of the latter. Each plate 50 has a slotted angular terminal tab portion 51 which is adapted to pass through the slot 49 of respective cross-members 20b, 20c. In position, the end portions of the flanges 47, 47 of the support member rest on the upper portion of lower flanges 40 of respective cross-members and if desired, a gusset plate 52 may be welded to a respective plate 50 and to the adjoining surface of the web 48. As seen in Figures 6 and 7, the lower margin of each gusset plate will also rest on the upper portion of lower flanges 40, whereas the vertical margin of each gusset plate will bear against the inner surface of the webs 42 of the cross-members 20b, 20c.

The cross-members 23 which cooperate with the cross-members 20b, 20c are modified to the extent that each is further provided with a wedge-like tongue 53 which passes through the slot of a respective terminal tab portion 51 and thereby lock the support member 12 in position. A king-pin 54 may be carried in downwardly extending relation by the support member. Preferably, a plate 55 spans and is welded to the flanges 47, 47 of the support member and this plate and the web 48 are formed with aligned openings to pass the upper part of the king-pin 54. As shown, the king-pin may be welded in position.

As earlier mentioned, my invention provides a bed assembly which may be assembled with the minimum of tools. Further, the various parts may be lettered or numbered for indentification so that a suitable instruction sheet may inform the unskilled of the preferred manner of the assembly of the various parts. Identification of the parts also makes it easy for repair parts to be ordered as well as providing for accurate control of inventory.

The hat-shaped section of the cross-members 23 provides an ideal support for the flooring of the bed. As shown in Figure 3, cross-pieces 55 of any suitable material may be supported by the horizontal flanges 24, 24 of the cross-members 23, the pieces extending between adjoining or spaced cross-members and being preferably flush with the web of such members. It is usually preferred to form the cross-pieces 55 of wood, either in whole panel plywood sections or in a plurality of pieces connected by tongue and groove connections and held against disassembly by transverse cross-pieces nailed or otherwise secured to the plurality of pieces.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A bed assembly for a vehicle, comprising a pair of longitudinally extending members having aligned openings, a first cross-member extending between said longitudinally extending members and having apertured portions at opposite ends extending through respective openings in said longitudinally extending members, and a second cross-member extending cross-wise of said longitudinally extending members and having a pair of spaced tongues respectively fitting into said apertured portions.

2. A bed assembly for a vehicle, comprising a pair of longitudinally extending members having aligned openings, a first cross-member extending between said longitudinally extending members and having spaced shoulders respectively abutting facing surfaces of said longitudinally extending members and spaced apertured portions extending through respective ones of said aligned openings, and a second cross-member extending cross-wise of said longitudinally extending members and having spaced tongues respectively fitting into said apertured portions, said tongues engaging the outwardly directed surfaces of said longitudinally extending members to hold the latter against material separation from said shoulders.

3. A bed assembly for a vehicle, comprising a pair of spaced longitudinally extending members having aligned openings, a first cross-member extending between said longitudinally extending members and having shoulders at opposite ends respectively abutting facing surfaces of said longitudinally extending members and having apertured tabs at said opposite ends extending through respective ones of said aligned openings and projecting from respective ones of the outwardly directed surfaces of said longitudinally extending members, and a second cross-member extending cross-wise of said longitudinally extending members and having spaced wedge-shaped tongues respectively fitting into the aperture of said tabs and bearing against respective ones of said outwardly directed surfaces to wedge said longitudinally extending members against respective ones of said spaced shoulders.

4. A bed assembly for a vehicle, comprising a pair of longitudinally extending channel members positioned with their flanges in facing relation and their webs upright, said webs having aligned openings, a first cross-member of channel section having its opposite ends abutting respective inwardly directed surfaces of said webs and having an apertured tab extending from each of said opposite ends and through a respective one of said aligned openings to a position laterally of the respective outwardly directed surfaces of said webs, and a second cross-member overlying and extending cross-wise of the upper flanges of said longitudinally extending channel members, said second cross-member having spaced wedge-shaped tongues respectively fitting within the apertures of said tabs and bearing against respective ones of said outwardly directed surfaces of said web to wedge said longitudinally extending members against respective opposite ends of said first cross-member.

5. The construction according to claim 4 wherein said second cross-member is of hat-shaped cross-section, and flooring supported by the flanges of said second cross-member.

6. A bed assembly for a vehicle, comprising spaced longitudinally extending members, a plurality of spaced cross-members extending cross-wise of said longitudinally extending members and having end portions extending therebeyond, said cross-members and said longitudinally extending members being joined by complementary interfitting portions in part carried by said cross-members and in part carried by said longitudinally extending members, and longitudinally extending rail members traversing respective end portions of said cross-members, said rail members and said cross-members being joined by complementary interfitting portions in part carried by said rail members and in part carried by said cross-members.

7. A bed assembly for a vehicle, comprising spaced longitudinally extending members, a plurality of spaced cross-members extending cross-wise of said longitudinally extending members and having end portions extending therebeyond, said cross-members and said longitudinally extending members being joined by a tongue carried by one fitting into an opening formed in a portion carried by the other, and longitudinally extending rail members traversing respective end portions of said cross-members, said rail members and said cross-members being joined by a tongue carried by one fitting into an opening formed in a portion carried by the other.

8. The construction of claim 7 wherein each rail member has spaced tongues extending in a longitudinal direction and each end portion of said cross-members has an opening for receiving a respective tongue, the tongues being seated within respective openings by longitudinal movement of a respective rail member in traversing relation with respective end portions of said cross-members.

9. A bed assembly for a vehicle, comprising a pair of longitudinally extending channel members positioned with their flanges in facing relation and their webs upright, said webs having aligned openings, a plurality of first cross-members of channel secton each having its opposite ends abutting respective inwardly directed surfaces of said webs and having an apertured tab extending from each of said opposite ends and through respective aligned openings to a position laterally of the respective outwardly directed surfaces of said webs, a plurality of second cross-members corresponding to said first cross-members and overlying and extending cross-wise of the upper flanges of said longitudinally extending channel members and having opposite end portions extending generally uniformly therebeyond, each of said second cross-members having spaced wedge-shaped tongues respectively fitting within the apertures of the tabs of corresponding first cross-members and bearing against respective ones of said outwardly directed surfaces of said web to wedge said longitudinally extending members against opposite ends of each of said first cross-members, each of said second cross-members having an opening in its opposite ends, and a pair of rail members, each being of channel size to closely receive the adjacent end portions of respective second cross-members and each having spaced tongues extending in a longitudinal direction and seated within the openings in said second cross-members by longitudinal movement of a respective rail member in traversing relation with respective end portions of said second cross-members.

10. A bed assembly for a tractor-drawn trailer, comprising spaced longitudinally extending members, a pair of spaced cross-members extending cross-wise of said longitudinally extending members, said cross-members and said longitudinally extending members being joined by a tongue carried by one fitting into an opening formed in a portion carried by the other, a support member, a king-pin carried by said support member for cooperation with the fifth wheel plate of the tractor, said support member extending between said cross-members and having tabs extending through openings in said cross-members.

11. A bed assembly for a tractor-drawn trailer, comprising a pair of spaced longitudinally extending members having paired aligned openings, a pair of first cross-members extending between said longitudinally extending members, each having shoulders at opposite ends respectively abutting facing surfaces of said longitudinally extending members and having apertured tabs at said opposite ends extending through respective pairs of said aligned openings and projecting from respective ones of the outwardly directed surfaces of said longitudinally extending members, said first cross-members having aligned openings intermediate their extent, a pair of second cross-members extending cross-wise of said longitudinally extending members and each having spaced wedge-shaped tongues respectively fitting into the apertures of the tabs carried by the corresponding first cross-member, said tongues of each second cross-member bearing against respective ones of said outwardly directed surfaces to wedge said longitudinally extending members against respective ones of the spaced shoulders of each first cross-member, a support member, a king-pin carried by said support member for cooperation with the fifth wheel plate of the tractor, said support member extending between and having its opposite ends abutting said pair of first cross-members, said support member having apertured tabs at its opposite ends which extend through the aligned openings in said first cross-members, and each of said second cross-members having tongues extending through the apertures in the respective tabs of said support member for locking the latter in position.

12. A bed assembly for a tractor-drawn trailer, comprising a pair of longitudinally extending channel members with their flanges in facing relation and their webs upright, said webs having spaced pairs of aligned openings, a plurality of first cross-members of channel section, each having its opposite ends abutting respective inwardly directed surfaces of said webs and having an apertured tab extending from each of said opposite ends and through a respective pair of aligned openings to a position laterally of the respective outwardly directed surfaces of said web, a plurality of second cross-members paired with and overlying said first cross-members and extending cross-wise of the upper flanges of said longitudinally extending channel members and having opposite end portions extending generally uniformly therebeyond, each of said second cross-members having spaced wedge-shaped tongues respectively fitting within the apertures of the tabs of underlying first cross-members and bearing against respective ones of said outwardly directed surfaces of said web to wedge said longitudinally extending members against respective opposite ends of each of said first cross-members, each of said second cross-members having an opening in its opposite ends, a pair of rail members, each being of channel size to closely receive the adjacent ends of said second cross-members and each having spaced tongues extending in a longitudinal direction and seated within the corresponding openings in said second cross-members by longitudinal movement of a respective rail member in traversing relation with respective end portions of said second cross-members, a support member, a kingpin carried by said support member for cooperation with the fifth wheel plate of the tractor, said support member extending between and having its opposite ends abutting a pair of adjoining first cross-members, said support member having apertured tabs at its opposite ends which extend through aligned openings in said pair of adjoining first cross-members, and each of the second cross-members paired with said adjoining first cross-members having a tongue extending through the apertures in the respective tabs of said support member for locking the latter in position.

13. The construction in accordance with claim 12 wherein each of said second cross-members is hat-shape in cross-section, and flooring interposed between adjoining second cross-members and supported by the flanges thereof.

References Cited in the file of this patent
UNITED STATES PATENTS

| 1,453,954 | Scholtes | May 1, 1923 |
| 2,591,346 | Fitzgerald | Apr. 1, 1952 |
| 2,791,439 | Swanson | May 7, 1957 |

FOREIGN PATENTS

| 49,697 | France | May 30, 1939 |